March 4, 1930.  R. M. JACKSON  1,749,250
ATTACHMENT FOR SEED PLANTERS
Filed May 19, 1927  2 Sheets-Sheet 1

Robert M. Jackson, INVENTOR.

Witnesses

BY
ATTORNEYS.

March 4, 1930.  R. M. JACKSON  1,749,250
ATTACHMENT FOR SEED PLANTERS
Filed May 19, 1927   2 Sheets-Sheet 2
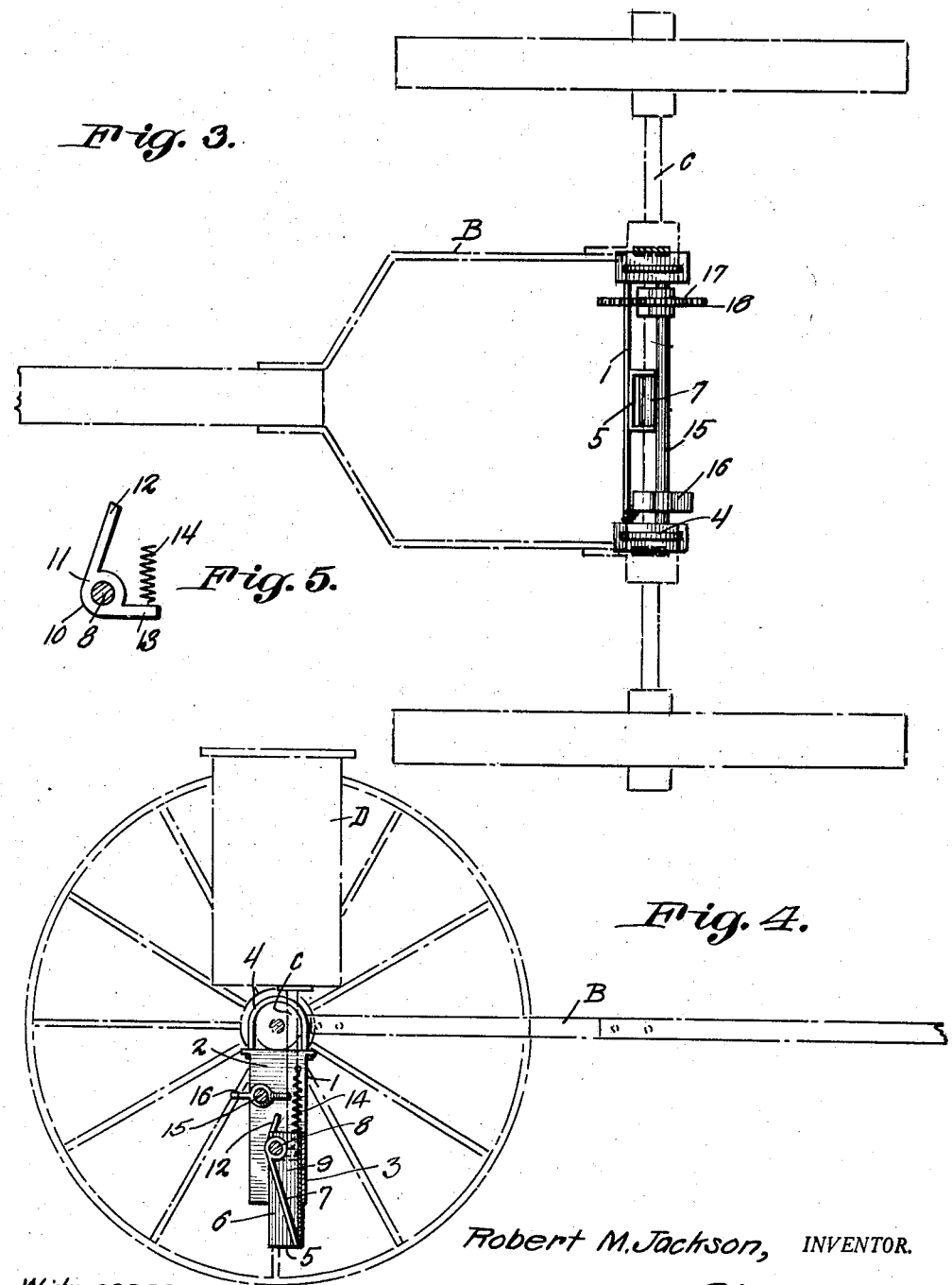
Robert M. Jackson, INVENTOR.
Witnesses
BY Richard B. Owen
ATTORNEYS.

Patented Mar. 4, 1930

1,749,250

UNITED STATES PATENT OFFICE

ROBERT M. JACKSON, OF LAKE CREEK, TEXAS

ATTACHMENT FOR SEED PLANTERS

Application filed May 19, 1927. Serial No. 192,731.

This invention relates particularly to an attachment which is adapted to be suspended below a seed hopper of the standard planter, such for instance as a cotton-seed planter, whereby seeds may be periodically distributed in the travel of the planter. The present invention has been particularly designed to accommodate itself to a planter of the standard type and to permit the attachment thereof with a minimum amount of effort.

An object of the invention is to provide an attachment that functions in conjunction with the seed hopper of the planter to receive the proper supply of seeds from the hopper and then periodically deposit the same.

An object of the invention is the novel compact arrangement of the component parts for direct operation from the axle of the planter.

A feature of the invention is the novel construction of the distributor and its associated parts so as to be periodically operated in the continuous travel of the planter over the ground.

Besides the above my invention distinguishes in two sets of mechanism one continuously operated by the axle of the planter in the travel thereof and the other periodically operated by the continuous operated mechanism.

With these and other objects in view the invention will be better understood from the detail description taken in connection with the accompanying drawing, wherein:—

Figure 1:
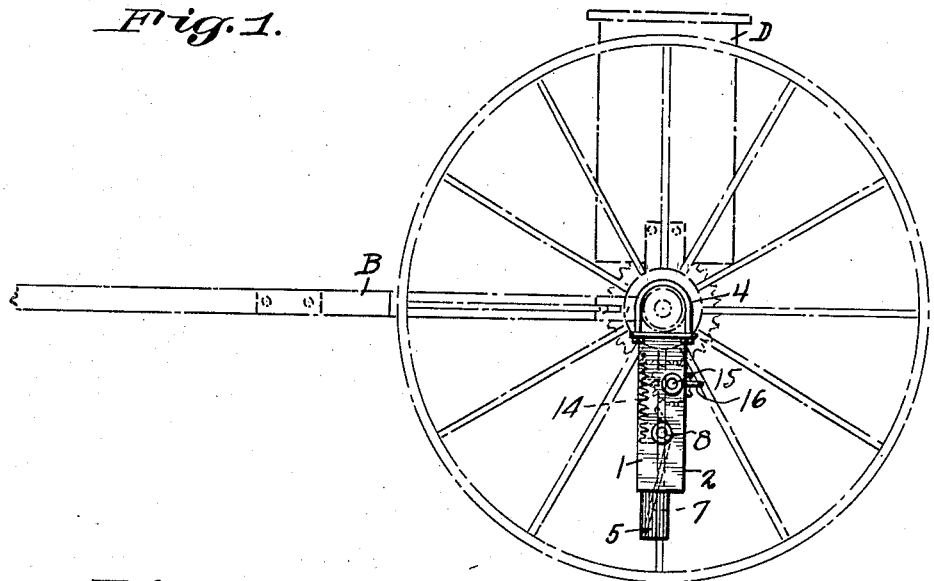
Figure 2:
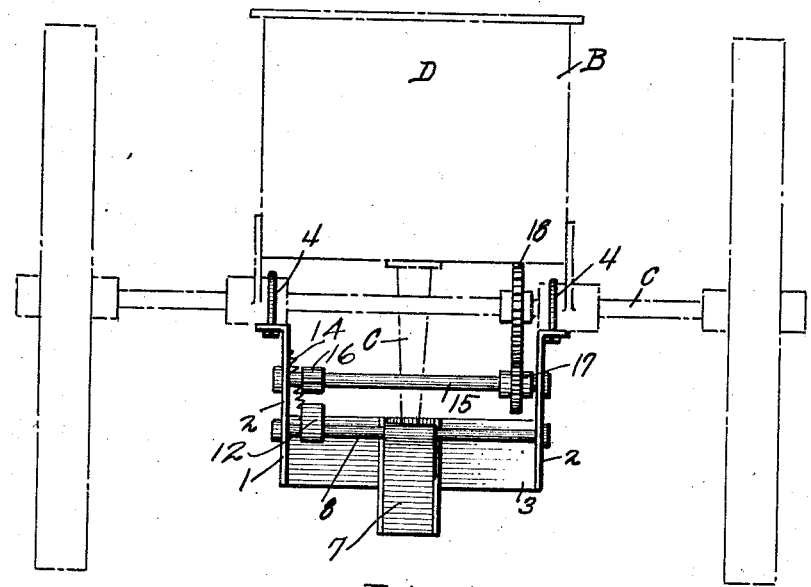

Figure 1 is a side elevation of a planter showing my attachment applied thereto, Figure 2 is a rear elevation, Figure 3 is a top plan view, Figure 4 is a longitudinal sectional view, Figure 5 is a detail view of one of the trips.

Again referring to the drawings illustrating one of the many constructions of my invention the numeral 1 designates a frame including the side bars 2 and the cross bar 3. The side bars 2 carry the clips 4 by means of which the frame is rigidly secured, in vertically suspended position to a stationary portion of the planter B. The cross bar 3 supports a chute 5 of U-shaped formation in cross section to provide the open rear side 6 to accommodate the gate 7 that is rigidly secured to a rod 8 rotatably mounted in the side bars 2. By referring to Figure 4 it will be noted that when the gate 7 is in closed position within the chute it extends at an angle to provide a tapering pocket 9 for the reception of the seed delivered from the spout C of the hopper D.

As shown in Figure 5 the rod 8 has secured thereto a trip 10 consisting of a collar 11 from which projects the arm 12 and lug 13, the latter in turn secured to a contractile spring 14 connected to the frame. The spring 14 is utilized to resiliently hold the gate in closed position as shown in Figure 4 so as to support the seeds until they are released by the operation of the gate by the operating mechanism now to be described. Also journaled in the side bars 2 is a drive shaft 15 to which is secured a double arm trip 16 so positioned that in the rotary movement thereof the arms will intermittently strike the arm 12 for periodically moving the gate to opening position.

The shaft 15 may be operated in various manners but in the drawings I have shown the shaft provided with a direct drive connection with the axle C of the planter so that in the movement of the planter over the ground the gate will be periodically moved to open position with the result that the seeds are uniformly distributed over the ground. As illustrated in the drawing, a small gear 17 is fixed to the shaft 15 and constantly meshes with a large gear 18 fixed to the axle C.

From the foregoing description taken in connection with the drawings it will be appreciated that in the travel of the planter over the ground the drive mechanism consisting of the shaft 15 and gears 17 and 18 will be continuously operated with the result that the arm of the trip 16 will intermittently strike the trip 10 for giving intermittent rocking movement to the rod 8 for periodically moving the gate to open position to drop the seeds which have been previously deposited in the chute. It is of course to be understood that the various parts may be designed in various other manners than illustrated and associated in other relations and the novel construction of distributor may be used with other forms of operating mechanism and therefore I do not desire to be limited in any manner except as set forth in the following claim.

What I claim is:

A seed dropping attachment adapted to be suspended from the axle of a standard planter below the spout of the usual seed hopper thereof, comprising a broad, flat, transverse, downwardly extending apron-like supporting frame member, having upwardly extending side bars integral therewith, means for detachably securing said bars to the axle of the planter, an intermittent delivery chute positioned beneath the spout of the seed hopper comprising a box having its rear vertical wall rigidly secured in engagement with the said apron for the major portion of its length whereby a firm support is obtained, an oscillating shaft extending through the side walls of the delivery chute box and journaled in the side bars of said apron, a flap valve within said box and mounted on said oscillating shaft, resilient means tending to hold the flap valve in closed position, and a second shaft likewise journaled in the said side bars and actuated from the axle of the planter for intermittently oscillating the shaft carrying said flap valve for depositing seed.

In testimony whereof I affix my signature.

ROBERT M. JACKSON.